Patented Aug. 16, 1949

2,478,978

UNITED STATES PATENT OFFICE 2,478,978

REACTION OF PODOCARPIC ACID AND CERTAIN HALO-ALKANOIC ACIDS AND PRODUCTS THEREOF

George M. Picha, Chicago, Ill., assignor to G. D. Searle & Co., Skokie, Ill., a corporation of Illinois No Drawing. Application March 31, 1948, Serial No. 18,287

6 Claims. (Cl. 260—520)

This invention relates to 6-carboxyalkoxy-1,12 - dimethyl - 1,2,3,4,9,10,11,12 - octahydrophenanthrene-1-carboxylic acids, to salts thereof, and to processes for preparing such acids and salts. In particular this invention relates to new compositions of matter having the following general structural formula

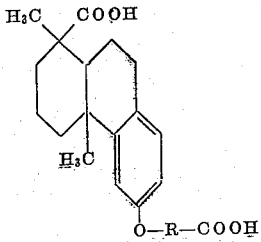

wherein R is a lower alkylene radical.

The substances to which this invention relates are useful in the preparation of complex compounds which are valuable in the formation of steroids and pharmaceuticals. The compounds are also useful pharmaceutical, insecticidal, and surface-active agents. It is the object of this invention to provide novel substances of the foregoing general formula for the above purposes. It is a further object to provide efficient methods for producing such substances.

In the foregoing structural formula, R represents a bivalent radical derived from a saturated aliphatic hydrocarbon containing 1 to 4 carbon atoms. The alkylene radical may be straight or branched chained. R therefore represents radicals such as methylene, ethylene, ethylidene, propylene, butylene and propylidene. In the foregoing structural formula, the ring bearing the —O—R—COOH group is aromatic and the other two rings are hydroaromatic. The double bonds are indicated. Where no double bonds are shown there are single bonds.

The compounds which comprise this invention can be prepared by reacting podocarpic acid with a mono-halogenated lower aliphatic acid (containing 2 to 5 carbon atoms) in the presence of alkali. Alkyl esters of mono-haloalkanoic acids may be employed also. Generally, one equivalent of the haloaliphatic acid per equivalent of podocarpic acid is sufficient, although it is preferred to use about 2 moles of halo aliphatic acid per mole of podocarpic acid, in order to obtain higher yields. The reaction is conveniently run in dilute aqueous alkali, the amount of base present being sufficient to neutralize the carboxyl groups of the podocarpic acid and the haloalkanoic acid and to provide sufficient alkali to neutralize the phenolic hydroxyl radical of the podocarpic acid. The reaction is preferably carried out at elevated temperature, such as the boiling point of the reaction mixture, for a period of 1 to 4 hours. At the end of that time, the desired product may be isolated from the reaction mixture by careful acidification, and the product may be further purified by recrystallization from a suitable solvent.

Salts of the acids of this invention may be prepared by reacting an alcoholic solution of the acid with two equivalents of an alcoholic solution of alkali and precipitating the alkali salt of the acid by means of a solvent which is alcohol-miscible but in which the salt is insoluble, such as ether or benzene. Salts may also be obtained by evaporation of the foregoing alcoholic solution, preferably under vacuum. Aqueous suspensions of the acids may also be neutralized with aqueous bases and evaporated in vacuo. Preferred bases for forming my salts are those derived from the alkali metals and ammonia, although water-soluble amines such as the alkylamines and alkanolamines are also suitable.

My invention is further illustrated by the following examples, which are provided for the purpose of disclosing in detail specific embodiments of my invention without limiting my invention thereto.

Example 1

137 parts of podocarpic acid and 95 parts of chloroacetic acid are dissolved in 2000 parts of water containing 100 parts of sodium hydroxide. The resulting solution is heated to reflux temperature for 4 hours, and then allowed to cool to room temperature. The solution of sodium 6-carboxymethoxy - 1,12 - dimethyloctahydrophenanthrene-1-carboxylate is added slowly to a constantly agitated solution of dilute mineral acid, such as hydrochloric acid. The precipitate of 6-carboxymethoxy-1,12-dimethyl-1,2,3,4,9,10,11,12-octahydrophenanthrene-1-carboxylic acid is removed by filtration, washed and dried. After recrystallization from dilute acetic acid it forms almost white crystals which melt at 190–193° centigrade. Other suitable solvents for recrystallization are benzene and combinations of benzene and petroleum ether. The melting point of the mixture of this acid with podocarpic acid is about 165° C. The compound has the following structural formula

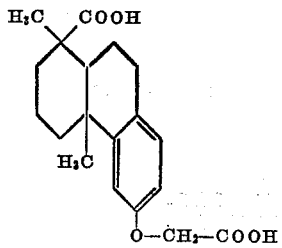

A solution of potassium 6-carboxymethoxy-1,12-dimethyloctahydrophenanthrene - 1 - carboxylate in aqueous potassium hydroxide and diethylene glycol is refluxed for 4 hours at about 170° C. At the end of this time the salt can be recovered unchanged, indicating that it is stable to alkaline hydrolysis at high temperature.

A solution of 6-carboxymethoxy-1,12-dimethyloctahydrophenanthrene-1-carboxylic acid in alcohol is titrated with alcoholic sodium hydroxide solution. After neutralization the solution is evaporated to dryness, preferably under reduced pressure. There is thus obtained sodium 6-carboxymethoxy - 1,12 - dimethyloctahydrophenanthrene-1-carboxylate. This salt is readily soluble in water.

Example 2

A mixture of 137 parts of podocarpic acid, 153 parts of β-bromopropionic acid, and 2000 parts of water is treated with sodium hydroxide solution until a clear, slightly basic (phenolphthalein) solution results. This is heated on a steam bath for one hour, with occasional addition of sodium hydroxide solution to keep it slightly basic. At hour intervals, 2 more additions, each of 75 parts of β-bromopropionic acid in an equivalent amount of sodium hydroxide solution, are made. Occasional addition of sodium hydroxide, as required, is continued. The total time of heating is 3 hours. The cooled reaction mixture is added slowly with constant agitation to dilute mineral acid. The precipitate of crude acid is treated in dilute alkali with about 1 mole of benzenesulfonyl chloride in order to convert any unreacted podocarpic acid to its benzenesulfonic acid ester, which is insoluble in dilute alkali. The 6-β-carboxyethoxy-1,12 - dimethyloctahydrophenanthrene-1-carboxylic acid remains in the alkaline solution as its salt. This acid is obtained as a viscous, light-colored oil upon acidification of the alkaline solution. It has the formula

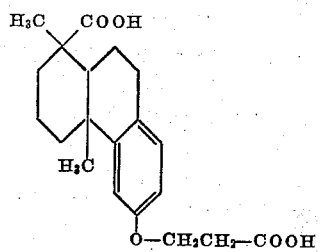

Example 3

By a process similar to that of Example 2, using a total of 218 parts of α-chloropropionic acid in place of 303 parts of β-bromopropionic acid, there is obtained 6-α-carboxyethoxy-1,12-dimethyloctahydrophenanthrene-1-carboxylic acid. This acid has the following structural formula

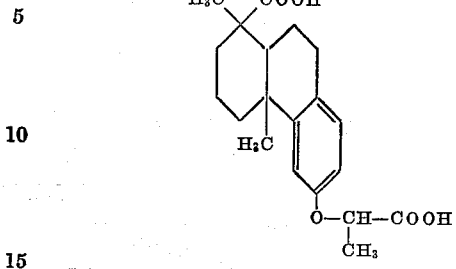

The sodium salt of 6-α-carboxyethoxy-1,12-dimethyloctahydrophenanthrene - 1 - carboxylic acid is readily prepared by the method of Example 1.

I claim:

1. A member of the group consisting of a 6-carboxyalkoxy - 1,12 - dimethyl-1,2,3,4,9,10,11,12-octahydrophenanthrene-1-carboxylic acid wherein the carboxyalkoxy radical contains not more than five carbon atoms, and alkali metal salts thereof.

2. A member of the group consisting of an acid having the structural formula

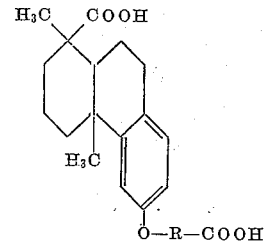

wherein R is an alkylene radical containing one to four carbon atoms, and alkali metal salts thereof.

3. A member of the group consisting of 6-carboxymethoxy-1,12-dimethyl- 1,2,3,4,9,10,11,12-octahydrophenanthrene-1-carboxylic acid, and alkali metal salts thereof.

4. 6-carboxymethoxy-1,12-dimethyl - 1,2,3,4,9,-10,11,12-octahydrophenanthrene - 1 - carboxylic acid.

5. The process of producing a 6-carboxyalkoxy-1,12 - dimethyl - 1,2,3,4,9,10,11,12-octahydrophenanthrene-1-carboxylic acid which comprises reacting podocarpic acid with a monohaloalkanoic acid containing two to five carbon atoms in the presence of alkali and isolating the product so formed.

6. The process of producing 6-carboxymethoxy-1,12 - dimethyl - 1,2,3,4,9,10,11,12-octahydrophenanthrene-1-carboxylic acid which comprises reacting podocarpic acid with chloroacetic acid in aqueous alkali and acidifying the reaction mixture to recover 6-carboxymethoxy-1,12-dimethyl-1,2,3,4,9,10,11,12 - octahydrophenanthrene-1-carboxylic acid.

GEORGE M. PICHA.

REFERENCES CITED

The following references are of record in the file of this patent:

Sherwood et al., J. Chem. Soc. (London), vol. 1938, pages 1006–1013. (Copy in Scientific Library.)